(12) United States Patent
Shpak

(10) Patent No.: US 8,547,946 B2
(45) Date of Patent: Oct. 1, 2013

(54) EFFICIENT CREATION OF WLAN CONNECTIONS

(75) Inventor: Eran Shpak, Tel Aviv (IL)

(73) Assignee: Extricom Ltd., Tel Aviv (IL)

( * ) Notice: Subject to any disclaimer, the term of this patent is extended or adjusted under 35 U.S.C. 154(b) by 236 days.

(21) Appl. No.: 13/098,465

(22) Filed: May 1, 2011

(65) Prior Publication Data

US 2012/0275443 A1 Nov. 1, 2012

(51) Int. Cl.
*H04W 4/00* (2009.01)

(52) U.S. Cl.
USPC ........................................ 370/338; 370/395.5

(58) Field of Classification Search
None
See application file for complete search history.

(56) References Cited

U.S. PATENT DOCUMENTS

| | | | |
|---|---|---|---|
| 6,581,111 B1 | 6/2003 | Lakhanpal et al. | |
| 7,797,016 B2 | 9/2010 | Eran et al. | |
| 8,032,117 B2 * | 10/2011 | Ross et al. | 455/411 |
| 2007/0147318 A1 * | 6/2007 | Ross et al. | 370/338 |
| 2008/0056272 A1 * | 3/2008 | Batta | 370/395.5 |
| 2008/0320108 A1 | 12/2008 | Murty et al. | |
| 2010/0074116 A1 | 3/2010 | Rodriguez et al. | |
| 2011/0243112 A1 * | 10/2011 | Misumi | 370/338 |

OTHER PUBLICATIONS

Dai Zovi et al., "Attacking Automatic Wireless Network Selection", pp. 1-10, Mar. 18, 2005.
Maxim et al., "Wireless Security: chapter 2—Wireless Threats", pp. 46-62, McGraw-Hill Companies, year 2002.
International Application PCT/IB2012/052061 Search Report dated Sep. 21, 2012 (pp. 1-8).
IEEE Std 802.11™—2007, "IEEE Standard for Information technology—Telecommunications and information exchange between systems—Local and metropolitan area networks—Specific requirements", Jun. 12, 2007.

* cited by examiner

*Primary Examiner* — David Oveissi
(74) *Attorney, Agent, or Firm* — D. Kligler I.P. Services Ltd.

(57) ABSTRACT

A method for communication includes receiving at a wireless access point (AP) a directed probe request from a client specifying a service set identifier (SSID) for which the AP was not configured prior to receiving the directed probe request. In reply to the directed probe request, the AP transmits a probe response to the client using the specified SSID.

18 Claims, 2 Drawing Sheets

EFFICIENT CREATION OF WLAN CONNECTIONS

FIELD OF THE INVENTION

The present invention relates generally to methods and systems for wireless communication, and specifically to operation of wireless local area networks (WLANs).

BACKGROUND OF THE INVENTION

WLANs have become ubiquitous in homes, workplaces, and public areas. WLAN data connections are commonly used not only by portable computers, but also by dual-mode (cellular/WiFi) smart phones and other types of mobile devices.

WLANs generally operate in accordance with the IEEE 802.11 family of standards, which define both physical layer and medium access control (MAC) protocol components. (The base standard at present is IEEE 802.11-2007.) The central building block of the protocol is the basic service set (BSS), which typically comprises an access point (AP) together with its associated stations (also referred to as clients or mobile devices). The BSS is uniquely identified by its basic service set identifier (BSSID), which serves as the MAC address of the AP. Typically, each AP has its own BSSID, but it is also possible for a number of interconnected APs to share a common BSSID, as described, for example, in U.S. Pat. No. 7,797,016, whose disclosure is incorporated herein by reference.

Each WLAN, comprising one or more APs, is identified by a service set identifier (SSID), which is broadcast by the APs to clients within range. The SSID, as distinct from the BSSID mentioned above, is a string up to thirty-two characters long. The SSID can be configured by the WLAN operator at the access point and usually comprises human-readable characters (such as "Smith Home WiFi"). The SSID is typically displayed on client devices that receive the AP broadcasts. This display enables users of the client devices to see a list of available networks, identified by their SSIDs, and to choose the one to which they wish to connect. Once the user has chosen to connect to a given SSID, many client devices will save a connection profile of the SSID and will use the profile to automatically connect to the same network thereafter.

SUMMARY

Embodiments of the present invention that are described hereinbelow provide methods and apparatus for improving communication service in wireless networks.

There is therefore provided, in accordance with an embodiment of the present invention, a method for communication, which includes receiving at a wireless access point (AP) a directed probe request from a client specifying a service set identifier (SSID) for which the AP was not configured prior to receiving the directed probe request. In reply to the directed probe request, a probe response is transmitted from the AP to the client using the specified SSID.

In a disclosed embodiment, the method includes receiving at the access point, following the probe response, an association request from the client directed to the specified SSID, and establishing a connection for exchanging data between the access point and the client responsively to the association request.

Typically, receiving the directed probe request includes receiving directed probe requests from multiple clients, specifying different, respective SSIDs, and transmitting the probe response includes transmitting multiple, respective probe responses from the AP to the clients using the respective SSIDs. In a disclosed embodiment the multiple, respective probe responses contain a common basic service set identifier (BSSID). Transmitting the multiple, respective probe responses may include transmitting the probe responses to only a fraction of the directed probe requests to which the AP is able to respond within a predefined time limit.

In one embodiment, transmitting the probe response includes prioritizing the probe response for transmission before other traffic to be transmitted by the AP.

In another embodiment, when the specified SSID refers to a secure network requiring predefined authentication credentials, the method may include, after transmission of the probe response, initiating an authentication procedure with the client despite the AP not having the authentication credentials.

There is also provided, in accordance with an embodiment of the present invention, a method for communication, which includes receiving at a wireless access point (AP) directed probe requests from multiple clients, specifying different, respective SSIDs. In reply to the directed probe requests, multiple, respective probe responses are transmitted from the AP to the clients using the respective SSIDs while using a common basic service set identifier (BSSID).

Transmitting the probe responses may include transmitting at least one probe response to a SSID for which the AP was not configured prior to receiving a directed probe request specifying the SSID.

There is additionally provided, in accordance with an embodiment of the present invention, a wireless access point, including a radio interface, which is configured to receive a directed probe request from a client specifying a service set identifier (SSID) for which the access point was not configured prior to receiving the directed probe request. A processor is coupled to receive the directed probe request from the radio interface and to cause the radio interface to transmit, in reply to the directed probe request, a probe response to the client using the specified SSID.

There is further provided, in accordance with an embodiment of the present invention, a wireless access point, including a radio interface, which is configured to receive directed probe requests from multiple clients, specifying different, respective SSIDs. A processor is coupled to receive the directed probe requests from the radio interface and to cause the radio interface to transmit, in reply to the directed probe requests, multiple, respective probe responses to the clients using the respective SSIDs while using a common basic service set identifier (BSSID).

The present invention will be more fully understood from the following detailed description of the embodiments thereof, taken together with the drawings in which:

DETAILED DESCRIPTION OF EMBODIMENTS

Figure 1:
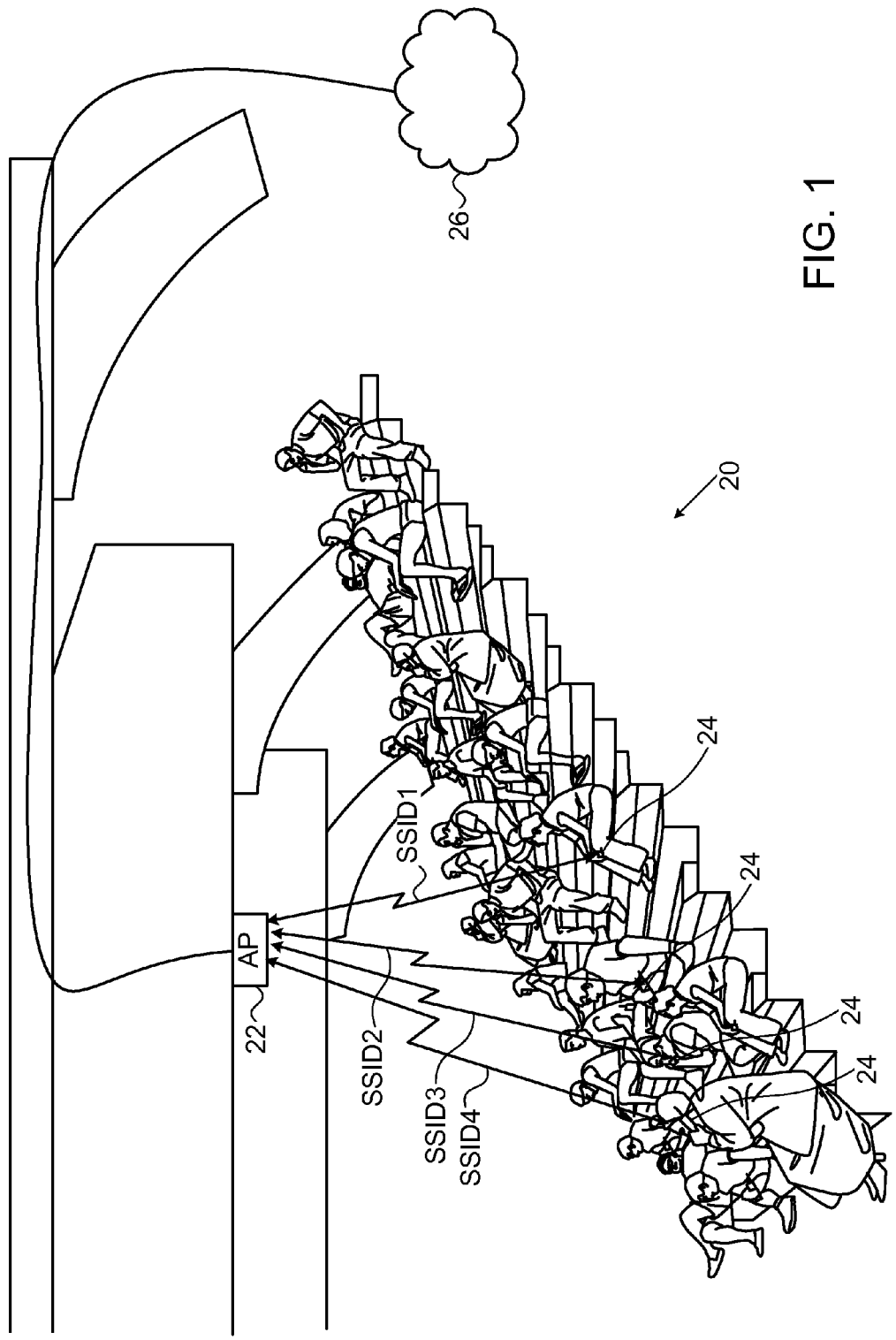
FIG. 1 is a schematic, pictorial illustration of a system for wireless communication, in accordance with an embodiment of the present invention.

Many mobile devices are configured to seek continually for an available WLAN until a suitable connection can be made.

Such devices generally use active scanning, in which the device broadcasts probe requests and then waits to receive any probe responses from access points (APs) within range. If the mobile device does not succeed in connecting with an AP within a certain time, it will typically transmit a further probe request to a different SSID, and will continue doing so on all available channels until a connection is made.

The IEEE 802.11 standards provide two types of probe requests:

Directed probe—The probe request frame transmitted by the mobile device specifies a certain SSID. Only APs that have been pre-configured with the SSID specified by the directed probe request are supposed to reply with a probe response.

Broadcast probe—The probe request frame in this case contains a null SSID. In reply, all APs within range may transmit probe responses containing their respective SSIDs.

Mobile devices are commonly configured to automatically transmit both types of probe requests (directed and broadcast) in alternation. Such mobile devices will typically transmit directed probe requests specifying SSIDs for which they have pre-stored connection profiles (by virtue of having made previous connections to the corresponding networks, for example). In this case, if a probe response is received, the mobile device will generally connect automatically, without user intervention.

On the other hand, when the mobile device transmits a broadcast probe and receives a probe response containing a previously-unknown SSID, the mobile device will typically prompt for user confirmation before proceeding to complete the connection. Although this mode of handling new SSIDs is not required by the 802.11 standard, it is implemented in most commercially-available mobile devices. The user, however, may be unaware that the mobile device is waiting for input. This situation may occur, for example, when the user carries a WLAN-capable smart phone in a pocket or carrying bag. In the absence of confirmation, the smart phone may continue transmitting repeated probe requests indefinitely.

The model of operation of the mobile device that is described above is not scalable over numbers of mobile devices in mutual proximity and can cause problems of network overload in crowded public places, as hundreds or even thousands of mobile devices continually transmit repeated probe requests. The inventors have found that in some cases, these probe requests fill all available WLAN channels so completely that little or no bandwidth is left for actual data traffic.

Embodiments of the present invention that are described hereinbelow address this problem by means of "SSID spoofing," which enables an AP to reply to directed probe requests even when the directed probe request specifies a SSID for which the AP was not previously configured. Upon receiving such a directed probe request from a given client, the AP reads the SSID from the probe request, and then transmits a probe response to the client using this same SSID, regardless of whether the AP was configured with this SSID before receiving the probe request. All of these probe response messages may contain a single, common and unique BSSID. Thus, for example, if Mr. Smith's smart phone transmits a directed probe request specifying the "Smith Home WiFi" SSID, the AP will reply with a probe response using the same SSID, as though it were the Smiths' home network.

As a result of this response from the AP, the client will stop (at least temporarily) transmitting probe requests and will attempt to associate with the AP. If the attempt is successful, a connection will be established between the AP and the client, and data exchange can then commence. The AP can interact in this manner with many different clients concurrently, each of which may specify a different, respective SSID; and the AP thus transmits multiple probe responses and may establish multiple data connections using the different SSIDs. These probe responses may contain a common BSSID even though their SSIDs are different.

The inventors have found this approach to be particularly useful in reducing network overload and facilitating data communications, particularly in crowded public places. The techniques of SSID spoofing that are described herein are not limited to this particular use, however, and may be applied for other purposes, as well. For example, SSID spoofing may be used for marketing purposes, in order to collect statistics regarding mobile devices in a given area, and possibly to push promotional content or other information to mobile devices with which spoofed connections are established.

FIG. 1 is a schematic, pictorial illustration of a system 20 for wireless communication, which implements the principles described above in accordance with an embodiment of the present invention. FIG. 1 illustrates a scenario in a stadium, for example, in which an AP 22 communicates with mobile devices 24 carried by multiple users who are attending a sports event. Although for the sake of simplicity, only a single AP is shown in FIG. 1, in practice system 20 may comprise multiple different APs in different, respective locations. Mobile devices 24 may comprise smart phones, personal digital assistants, portable computers, or any other suitable WLAN-enabled devices.

Devices 24 may be in active use by their respective users, to conduct data exchanges such as telephone calls, browser sessions, or e-mail transmission or reception. These devices communicate via AP 22 with a wide-area network 26, such as the Internet. At any given time, however, most of devices 24 will likely be in standby mode, in which the devices autonomously attempt to establish data connections with an available WLAN while awaiting such a data exchange. In this mode, devices 24 generally transmit probe requests, including both broadcast probe requests and directed probe requests until a connection is made. Each directed probe request specifies a certain SSID, which is typically stored as part of a network profile in the respective device 24. In the pictured example, different devices transmit directed probe requests specifying SSID1, SSID2, SSID3, SSID4, . . . .

Figure 2:
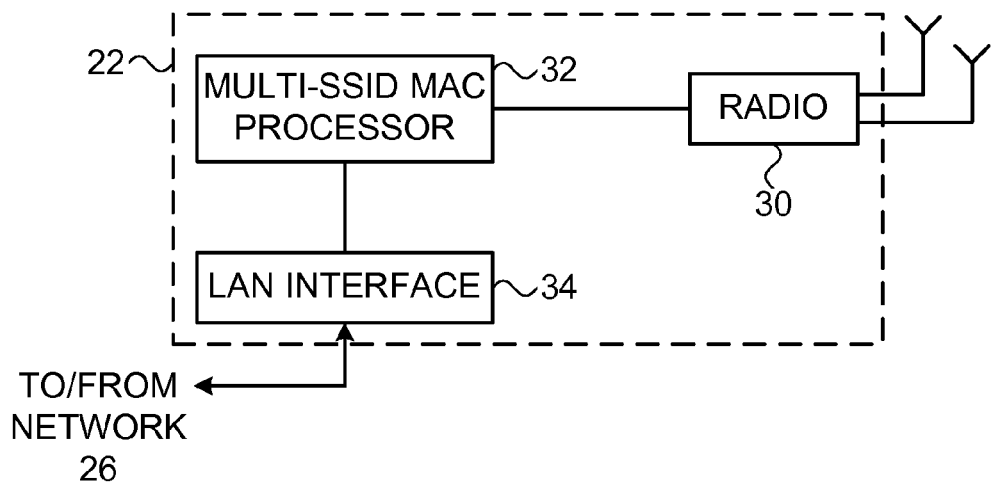
FIG. 2 is a block diagram showing details of a wireless access point, in accordance with an embodiment of the present invention.

FIG. 2 is a block diagram that schematically shows details of access point 22, in accordance with an embodiment of the present invention. A radio interface 30 receives signals from and transmits signals to mobile devices 24 in accordance with an applicable WLAN standard. The radio interfaces demodulates and passes incoming signals to a MAC processor 32. The MAC processor is configured to support multiple SSIDs concurrently, including SSIDs for which the AP was not configured prior to receiving directed probe request specifying these SSIDs, as explained above. MAC processor 32 connects to network 26 via a suitable network interface 34, such as a wired local area network (LAN) interface.

MAC processor 32 typically comprises hard-wired or programmable logic circuits, which are configured to carry out 802.11 processing functions, as are known in the art, in conjunction with the SSID spoofing functions that are described herein. Alternatively or additionally, MAC processor 32 may comprise a programmable microprocessor, which is programmed in software to carry out at least some of these functions. The software may be downloaded to processor 32 in electronic form, over a network, for example. Additionally or alternatively, the software may be stored on non-transitory tangible storage media, such as optical, magnetic, or electronic memory media. As another alternative, at least some of the MAC processing functions in system 20, including the SSID spoofing functions, may be carried out by a central management hub (not shown), in a configuration such as that described in the above-mentioned U.S. Pat. No. 7,797,016.

Figure 3:
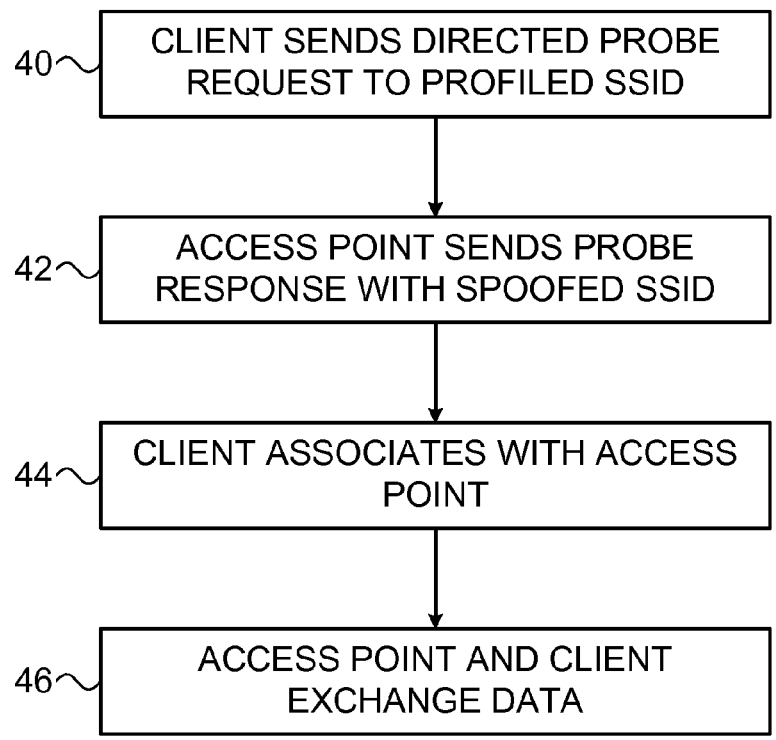
FIG. 3 is a flow chart that schematically illustrates a method for communication, in accordance with an embodiment of the present invention.

FIG. 3 is a flow chart that schematically illustrates a method for communication using SSID spoofing, in accordance with an embodiment of the present invention. The method is described, for the sake of clarity, with specific reference to the components of system 20, but it may similarly be implemented in substantially any sort of WLAN.

The method is initiated when a given device 24 (also referred to as a client) transmits a directed probe request, at a probe transmission step 40. This probe request specifies a certain SSID, typically one for which the client has stored a profile with connection characteristics, possibly as a result of a previous connection to the network to which the SSID actually belongs. Typically, multiple clients may transmit such probe requests concurrently, each specifying its own SSID.

Access point 22 reads the SSID from the directed probe request and generates a probe response using the same SSID, at a response step 42, regardless of whether the access point was previously configured with this SSID. Each probe response contains both the SSID specified by the appropriate mobile device 24 and the BSSID of the access point. Thus, the access point may transmit probe responses (and other messages) with multiple different SSIDs, but all with a common BSSID.

The 802.11 standard requires access points to respond to directed probe requests rapidly, typically within a few milliseconds. In a busy network, such as in the situation shown in FIG. 1, however, the length of the transmit queue of AP 22 may be much longer than a few milliseconds of transmission time. If device 24 does not receive a probe response within the required time limit, it will move on to transmit its next probe request on another channel and will ignore belated responses to the previous probe request. In order to avoid this problem, AP 22 may transmit directed probe responses at step 42 with higher priority than other traffic. For this purpose, AP 22 may maintain a separate, high-priority queue for these probe responses.

If AP 22 is still unable to respond to a given directed probe request within the prescribed time limit (due to the length of the probe response queue, for example), it will typically drop the given request entirely rather than waste bandwidth on a probe response that is likely to be ignored by the mobile device to which it is directed. Thus, in busy network conditions, in which AP 22 receives many directed probe requests concurrently, the AP may send responses only to the fraction of the probe requests to which it is able to respond within the time limited imposed by the standard.

When a client receives a probe response with a recognized SSID, it attempts to complete a connection with the AP that sent the probe response, at an association step 44. For this purpose, the client transmits authentication and association request frames, in accordance with the 802.11 standard. As long as the client's stored profile for the SSID in question does not require security features (such as a password), the client and AP 22 should be able to complete the association automatically, without user intervention. AP 22 and device 24 will then be able to exchange data as appropriate, at a data exchange step 46. In the meanwhile, device 24 will refrain from transmitting further probe requests and will therefore, for the most part, not interfere with transmissions to and from other devices. AP 22 establishes and maintains connections of this sort concurrently with multiple different devices 24, using multiple different SSIDs.

For secure networks, the 802.11 standard mandates an authentication procedure known as a "Four-Way Handshake." AP 22 may be configured to initiate this procedure at step 44, despite not having the credentials needed to complete the procedure, and may continue the procedure for as long as possible, taking advantage of long timeout periods that are provided by the standard. As a result, even if device 24 is unable to complete the association at step 44 (due to security features in the client profile, for example), the device will still be occupied for some time in carrying out the protocol exchange. During this period, device 24 will refrain from transmitting further probe requests, and the interference due to repeated probe requests will be mitigated, even if not eliminated entirely. When the association attempt at step 44 fails, device 24 will transmit a further directed probe request, and the process will accordingly begin again at step 40, for as long as the device is within range of AP 22 or until the user of the device takes some action.

Although the embodiments described above relate mainly to mitigating interference due to probe requests, these methods of SSID spoofing may similarly be used for other purposes, such as gathering and/or distributing marketing-related information, as noted above. It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for communication, comprising:
   receiving at a first wireless access point (AP) in a first network a directed probe request from a client specifying a service set identifier (SSID) for which the client stored a connection profile by virtue of having made a previous connection to a second wireless AP in a different, second network to which the SSID corresponds, wherein the first AP was not configured for the SSID prior to receiving the directed probe request; and
   in reply to the directed probe request, transmitting a probe response from the first AP to the client by reading the SSID from the directed probe request and spoofing the SSID in the probe response.

2. The method according to claim 1, and comprising:
   receiving at the access point, following the probe response, an association request from the client directed to the specified SSID; and
   establishing a connection for exchanging data between the access point and the client responsively to the association request.

3. The method according to claim 1, wherein receiving the directed probe request comprises receiving directed probe requests from multiple clients, specifying different, respective SSIDs, and
   wherein transmitting the probe response comprises transmitting multiple, respective probe responses from the AP to the clients using the respective SSIDs.

4. The method according to claim 3, wherein the multiple, respective probe responses contain a common basic service set identifier (BSSID).

5. The method according to claim 3, wherein transmitting the multiple, respective probe responses comprises transmitting the probe responses to only a fraction of the directed probe requests to which the AP is able to respond within a predefined time limit.

6. The method according to claim 1, wherein transmitting the probe response comprises prioritizing the probe response for transmission before other traffic to be transmitted by the AP.

7. The method according to claim 1, wherein the specified SSID refers to a secure network requiring predefined authentication credentials, and wherein the method comprises, after transmission of the probe response, initiating an authentication procedure with the client despite the AP not having the authentication credentials.

8. A method for communication, comprising:
    receiving at a first wireless access point (AP) in a first network directed probe requests from multiple clients, specifying different, respective service set identifiers (SSIDs) for which the clients stored connection profiles by virtue of having made previous connections to second wireless APs in different, second networks to which the SSIDs correspond; and
    in reply to the directed probe requests, transmitting multiple, respective spoofed probe responses from the AP to the clients using the respective SSIDs while using a common basic service set identifier (BSSID).

9. The method according to claim 8, wherein transmitting the probe responses comprises transmitting at least one probe response to a SSID for which the AP was not configured prior to receiving a directed probe request specifying the SSID.

10. A wireless access point, comprising:
    a radio interface, which is configured to receive a directed probe request from a client in a first network specifying a service set identifier (SSID) for which the client stored a connection profile by virtue of having made a previous connection to another, different network to which the SSID corresponds, wherein the access point was not configured for the SSID prior to receiving the directed probe request; and
    a processor, which is coupled to receive the directed probe request from the radio interface and to cause the radio interface to transmit, in reply to the directed probe request, a probe response to the client by reading the SSID from the directed probe request and spoofing the SSID in the probe response.

11. The access point according to claim 10, wherein the processor is configured to receive, following the probe response, an association request from the client directed to the specified SSID, and to establish a connection for exchanging data between the access point and the client responsively to the association request.

12. The access point according to claim 10, wherein the processor is configured to receive directed probe requests from multiple clients, specifying different, respective SSIDs, and to cause the radio interface to transmit multiple, respective probe responses to the clients using the respective SSIDs.

13. The access point according to claim 12, wherein the multiple, respective probe responses contain a common basic service set identifier (BSSID).

14. The access point according to claim 12, wherein the processor is configured to transmit the probe responses to only a fraction of the directed probe requests to which the access point is able to respond within a predefined time limit.

15. The access point according to claim 10, wherein the processor is configured to prioritize the probe response for transmission before other traffic to be transmitted by the AP.

16. The access point according to claim 10, wherein the specified SSID refers to a secure network requiring predefined authentication credentials, and wherein the processor is configured, after transmission of the probe response, to initiate an authentication procedure with the client despite the access point not having the authentication credentials.

17. A wireless access point, comprising:
    a radio interface, which is configured to receive directed probe requests from multiple clients in a first network, specifying different, respective service set identifiers (SSIDs) for which the clients stored connection profiles by virtue of having made previous connections to different, second networks to which the SSIDs correspond; and
    a processor, which is coupled to receive the directed probe requests from the radio interface and to cause the radio interface to transmit, in reply to the directed probe requests, multiple, respective spoofed probe responses to the clients using the respective SSIDs while using a common basic service set identifier (BSSID).

18. The access point according to claim 17, wherein the processor is configured to cause the radio interface to transmit at least one probe response to a SSID for which the access point was not configured prior to receiving a directed probe request specifying the SSID.

* * * * *